United States Patent
Tewari et al.

(10) Patent No.: US 7,792,949 B2
(45) Date of Patent: Sep. 7, 2010

(54) METHOD AND SYSTEM FOR VIDEO NETWORK DISCOVERY

(75) Inventors: Jayanta Tewari, Austin, TX (US); Nainesh Desai, Cedar Park, TX (US)

(73) Assignee: Tandberg Telecom AS, Lysaker (NO)

( * ) Notice: Subject to any disclaimer, the term of this patent is extended or adjusted under 35 U.S.C. 154(b) by 1731 days.

(21) Appl. No.: 10/210,918

(22) Filed: Aug. 2, 2002

(65) Prior Publication Data

US 2003/0126617 A1  Jul. 3, 2003

Related U.S. Application Data

(60) Provisional application No. 60/343,773, filed on Dec. 28, 2001.

(51) Int. Cl.
   *G06F 15/173* (2006.01)
(52) U.S. Cl. .................. 709/224; 709/223; 709/217; 709/219; 709/220; 370/392; 370/260
(58) Field of Classification Search .......... 725/119, 725/127; 711/147; 710/104, 305; 726/2, 726/22, 25, 27; 370/223, 254, 255, 328, 370/338, 392, 260, 401; 713/176; 709/217, 709/219, 220, 223, 224
See application file for complete search history.

(56) References Cited

U.S. PATENT DOCUMENTS

| | | | |
|---|---|---|---|
| 2002/0027569 A1* | 3/2002 | Manni et al. ................. | 345/764 |
| 2002/0143905 A1* | 10/2002 | Govindarajan et al. ...... | 709/220 |
| 2002/0165934 A1* | 11/2002 | Conrad et al. ............... | 709/223 |
| 2003/0195957 A1* | 10/2003 | Banginwar .................. | 709/223 |
| 2005/0094581 A1* | 5/2005 | Giloi et al. .................. | 370/260 |
| 2005/0117597 A1* | 6/2005 | Jones et al. ................. | 370/401 |
| 2006/0274755 A1* | 12/2006 | Brewer et al. ............... | 370/392 |

* cited by examiner

*Primary Examiner*—Barbara N Burgess
(74) *Attorney, Agent, or Firm*—Oblon, Spivak, McClelland, Maier & Neustadt, L.L.P.

(57) ABSTRACT

Network device discovery method and system performs network device discovery in a more efficient manner by retrieving information from a registration network device about other network devices and then using the retrieved information to select discovery tests to discover the configuration of the other network devices in a more efficient manner. For instance, video network device discovery process identifies a gatekeeper and retrieves the registration list of video devices from the gatekeeper. The video devices on the gatekeeper registration list are then queried with selected discovery tests to determine network configuration for the devices, such as device type, without having to use unnecessary discovery tests associated with the discovery of other types of network devices.

13 Claims, 3 Drawing Sheets

| DEVICE ID | IP ADDRESS | PROTOCOL | DEVICE TYPE | VENDOR | MODEL |
|---|---|---|---|---|---|
| D-14A | 10.0.01 | SNMP | Endpoint | VTEL | Galaxy SL |
| D-14B | 10.0.0.10 | Telnet | Endpoint | ACME | XB-32 |
| D-16A | 10.0.0.9 | HTTP | MCU | VTEL | MCU-II |
| D-18 | 10.0.0.3 | SNMP | Gateway | VTEL | Galaxy XL |
| D-18 | 10.0.0.4 | SNMP | Gateway | VTEL | Galaxy XL |
| D-20 | 10.0.0.5 | VT-100 | Gatekeeper | Illudium | Q-36 |
| ... | ... | ... | ... | ... | ... |

*FIGURE 3*

METHOD AND SYSTEM FOR VIDEO NETWORK DISCOVERY

RELATED APPLICATIONS

This patent application claims priority from U.S. Provisional Patent Application Ser. No. 60/343,773, entitled "Intelligent Video Network Discovery" and filed on Dec. 28, 2001.

BACKGROUND OF THE INVENTION

1. Field of the Invention

The present invention relates in general to the field of video conferencing, and more particularly to a method and system for discovery of devices interfaced with a video network.

2. Description of the Related Art

Video networks interface video devices to provide video conferencing for participants to both see and hear each other. For instance, a single video network might include a number of geographically dispersed video endpoints that display and gather audio and video signals of participants. Another typically used video device is a multi-point control unit (MCU) for controlling multiple participants in a video conference. Gateways are video devices that maintain data transmission compatibility for video devices that use different standards, such as the H.320 and H.323 standards. Gatekeepers are video devices that accept endpoint registrations, translate names to Internet Protocol addresses and govern calls to manage bandwidth. In addition, a video network might include a variety of traditional network devices, such as servers, desktop computers, routers, etc. . . . , for handling data or performing video device functions, such as with video over Internet Protocol.

To aid in the management of video devices, video networks often include a network management system (NMS), also known as an administrative workstation, to facilitate managing and monitoring activities for network devices. For instance, a network management station typically includes a discovery engine that performs a discovery process to discover and store network configuration information. Network configuration information typically identifies the types of network devices that are present on the network and provides operating characteristics for those devices. When a network management station first interfaces with a network, it typically performs the discovery process to obtain and store network configuration information. Generally, at the start of the discovery process the network management station has no prior knowledge about the network and its components and the discovery process proceeds through a series of tests to identify all components of the network. For instance, the tests are a typically a series of filters that the discovery engine passes each network device through until a match takes place. Some examples of discovery engine filters include IP filters, SNMP filters, router filters, switch filters, Cisco device filters, RADVISION filters, etc. . . . . Once a matching test is found for a network device, the discovery engine classifies the device and the discovery process proceeds to another network device.

One difficulty with a conventional discovery process is that it is typically inefficient and slow due to the number of tests run on network devices. Video networks are typically highly optimized in terms of resource availability and processing power, and are designed to interact as seamlessly as possible with standard protocols. However, the conventional discovery process lacks optimization and indeed is slowed by the use of a seamless design generally desired in conventional networks. Essentially, the discovery process seeks information to differentiate network devices that are designed to look and feel the same on the network. Thus, to definitively identify all devices in a network, the discovery engine generally must run through a complete set of filters including otherwise unnecessary tests for a given network device.

SUMMARY OF THE INVENTION

Therefore a need has arisen for a method and system which improves the efficiency of the discovery of network devices.

A further need exists for a method and system which optimizes the discovery of video network devices.

In accordance with the present invention, a method and system are provided which substantially reduce the disadvantages and problems associated with previous methods and systems for discovery of network devices. The efficiency of the discovery process is improved by discovering network devices that store information about other network devices and by using the stored information to reduce the number of discovery tests performed to discover the configuration of the other network devices.

More specifically, a discovery engine interfaces with a network having plural network devices and performs discovery of the network devices with plural network discovery tests to determine the configuration of the network. Upon initiation of the discovery process, the discovery engine retrieves a list of devices from a registration network device and uses the list to perform discovery on the network devices of the list with a selected set of some of the discovery tests. The discovery module uses the list to eliminate some of the discovery tests as unnecessary since the eliminated tests are used for network devices not on the registration list. In one embodiment, the discovery engine includes instructions to perform discovery on the registration device early in the discovery process to obtain the registration list, thus making the discovery process more efficient by making the registration list available before discovery proceeds with devices on the list. Further, if the registration list includes other registration devices, then discovery of the network devices on the lists of those other registration devices similarly improves the efficiency of the discovery process.

In one embodiment, the registration device is a video gatekeeper device that maintains a registration list of video devices. Upon discovery of a gatekeeper device, the discovery engine retrieves the gatekeeper device's registration list of video devices and performs discovery of the video devices with a selected discovery test or selected set of discovery tests that are associated with the video devices of the registration list. For instance, the discovery engine uses a limited set of discovery tests, such as discovery tests associated with classifying devices by video device type, on the devices identified by the list. The use of a limited set of relevant discovery tests avoids the use of discovery tests associated with devices not on the list that would otherwise be used in the discovery process. The gatekeeper registration list identifies video devices within the gatekeeper's zone and also identifies gatekeepers of neighboring zones so that the discovery engine may proceed from one gatekeeper registration list to another, thus effectively identifying a video network and efficiently performing the discovery of the video network devices.

The present invention provides a number of important technical advantages. One example of an important technical advantage is that a discovery engine more efficiently discovers network devices by retrieving lists of network devices from registration network devices, such as gatekeeper video devices. By knowing the type of devices associated with the registration list, the discovery engine may select discovery tests tailored to the discovery of those types of devices, thus reducing the number of discovery tests that are performed to discover the network configuration.

Another example of an important technical advantage of the present invention is that discovery of specific types of network devices is performed by identifying a list of the devices stored on the network. For instance, discovery of a video network is performed by identifying gatekeepers of the video network and then discovering the video devices identified by the gatekeepers' registration lists. Thus, in addition to improving the efficiency of the discovery process by eliminating unnecessary discovery tests, the present invention allows priority of the discovery process to the type of devices, such as video devices, identified by the registration list.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 3 depicts an example of a video network configuration.

DETAILED DESCRIPTION

Discovery of a network configuration is typically an inefficient process due to the series of discovery tests run on each device to identify the configuration of the network. Typically, a number of unnecessary discovery tests are run before a match is located for a network device. The present invention improves the efficiency of the discovery process by avoiding or limiting these unnecessary tests. Network discovery is performed more efficiently by locating a store of information on a network device regarding the configuration of one or more other network devices, such as information regarding the nature of the other network devices, and by using the information to implement or remove discovery tests, such as selecting device filtering mechanisms for device identification of the other devices. For instance, in a video network having a gatekeeper, for the devices registered with the gatekeeper the discovery engine is able to skip router, switch and Cisco discovery filters since router, switch and Cisco network devices are not found in a gatekeeper registration list. Thus, discovery of the network configuration for the video devices found on the gatekeeper registration list is more efficient without the use of these unnecessary discovery tests.

Figure 1:
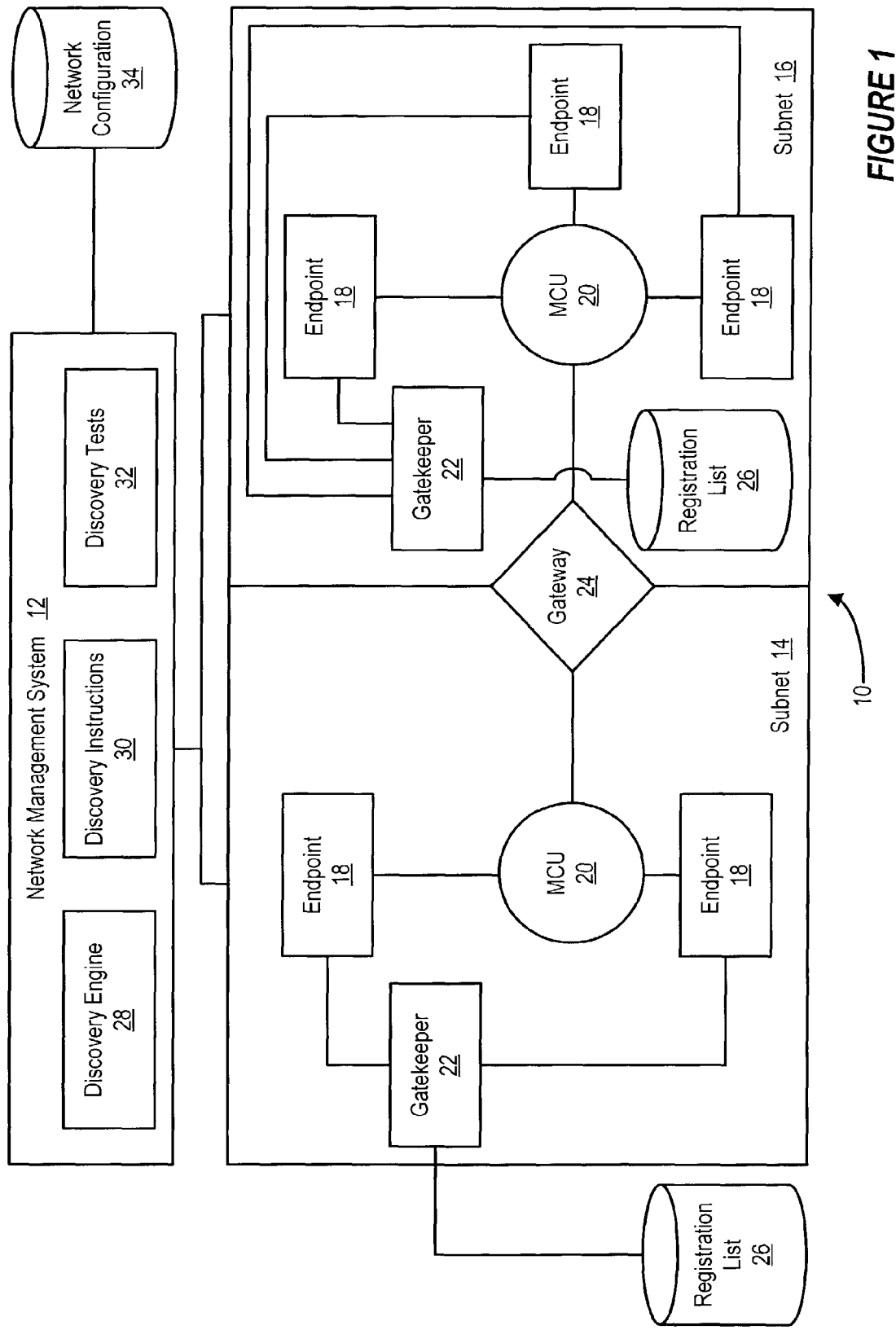
FIG. 1 depicts a block diagram of a video network managed by a network management station.

Referring now to FIG. 1, a block diagram depicts a video network 10 managed by a network management station 12. Video network 10 includes a first zone 14 defined in a first subnet and a second zone 16 defined in a second subnet. Zone 14 has two video endpoints 18 each interfaced with an MCU 20 and a gatekeeper 22. Zone 16 has three endpoints 18, each also interfaced with an MCU 20 and a gatekeeper 22. A gateway 24 interfaces zone 14 and zone 16. Video calls are established between endpoints 18 through video network 10 by using MCU's 20 to support video calls between three or more endpoints 18, gateway 24 to support video calls between endpoints that use different standards, and gatekeepers 22 to provide Internet Protocol addresses and to govern calls to manage bandwidth. The endpoint, MCU, gateway and gatekeeper devices are typically specialized hardware and software packages, although the functions of each device may be performed with software modules operating on computing platforms such as servers or personal computers.

Gatekeepers 22 each maintain a registration list of network devices in their respective zones, although some devices in a zone do not have to register and non-Internet Protocol devices, such as H.320 devices do not typically communicate with gatekeepers. Each gatekeeper 22 registration list 26 identifies all participating video network devices in the gatekeeper's zone primarily so that the gatekeeper is able to accept endpoint registrations and translate endpoint logical names to Internet Protocol addresses in support of video calls. Gatekeepers 22 also typically keep information about gatekeepers associated with neighboring zones, with each gatekeeper maintaining a registration list 26 of video devices in its zone. Thus, a series of gatekeepers 22 interfaced within a video network 10 are able to communicate to locate network devices in any zone having a gatekeeper 22 by querying the registration list 26.

Network management station 12 includes a discovery engine 12 that runs discovery instructions 30 identifying desired discovery tests 32 to determine and store the network configuration 34. Discovery engine 30 runs discovery tests 32 for general IP-addressable network devices until a discovery test matches the device. Video network devices deployed over an enterprise's IP network become similar entities to the large number of other IP-addressable devices generally found on IP networks. IP networks generally lack any special information or communication capability that distinguishes network devices, including video devices, until a discovery process has tested each device. Thus, until discovery is complete on a network device, the configuration of the network device is generally unknown to discovery engine 28.

Discovery instructions 30 include instructions to have discovery performed first, or as early as possible, on one or more gatekeeper devices 22. When discovery engine 28 finds a gatekeeper 22, discovery engine 28 accesses the registration list 26 of gatekeeper 22, thus effectively identifying the video devices for that gatekeeper 22's zone, including the E164 addresses, zone information, IP addresses and DNS names of the video devices. Discovery engine 28 is then able to dynamically determine the discovery test or discovery tests needed to discover the configuration of the devices on the registration list 26 and to eliminate unnecessary discovery tests that are associated with devices not on the registration list 26. Discovery engine 28 proceeds with discovery of the configuration of the devices on registration list 26 with the selected discovery tests to obtain desired configuration information directly from the devices, such as information needed to classify the devices according to video device type.

Discovery process efficiency is enhanced if discovery instructions identify gatekeepers 22 so that discovery engine 28 is able to access registration list 22 early in the discovery process. However, if the location of gatekeeper devices 22 is not known in advance, discovery engine 28 proceeds with discovery until a gatekeeper 22 is located. Once a gatekeeper 22 is located, discovery engine 22 accesses registration list 26 and discovers the configuration of the network devices on the list. In addition, discovery engine 22 determines any additional gatekeeper devices known to the identified gatekeeper 22 and proceeds with discovery of these additional gatekeeper devices 22 so that the discovery process effectively steps from gatekeeper 22 to gatekeeper 22 until the configuration is discovered for all of the video devices in the network that are registered with a gatekeeper 22. By proceeding from gatekeeper 22 to gatekeeper 22, discovery engine 28 not only performs the discovery of the network configuration in a more efficient manner, but also gives priority to the video network devices relative to other network devices and, when finished, identifies the video network. In addition, a more meaningful representation of the video network is possible by accessing information maintained by gatekeepers 22, such as alias in the form of email addresses or other strings, bandwidth related information or other video network specific information. Further, network management system 12 may periodically repeat the discovery process to detect added devices and to learn about off-line devices that are no longer registered with a gatekeeper.

Figure 2:
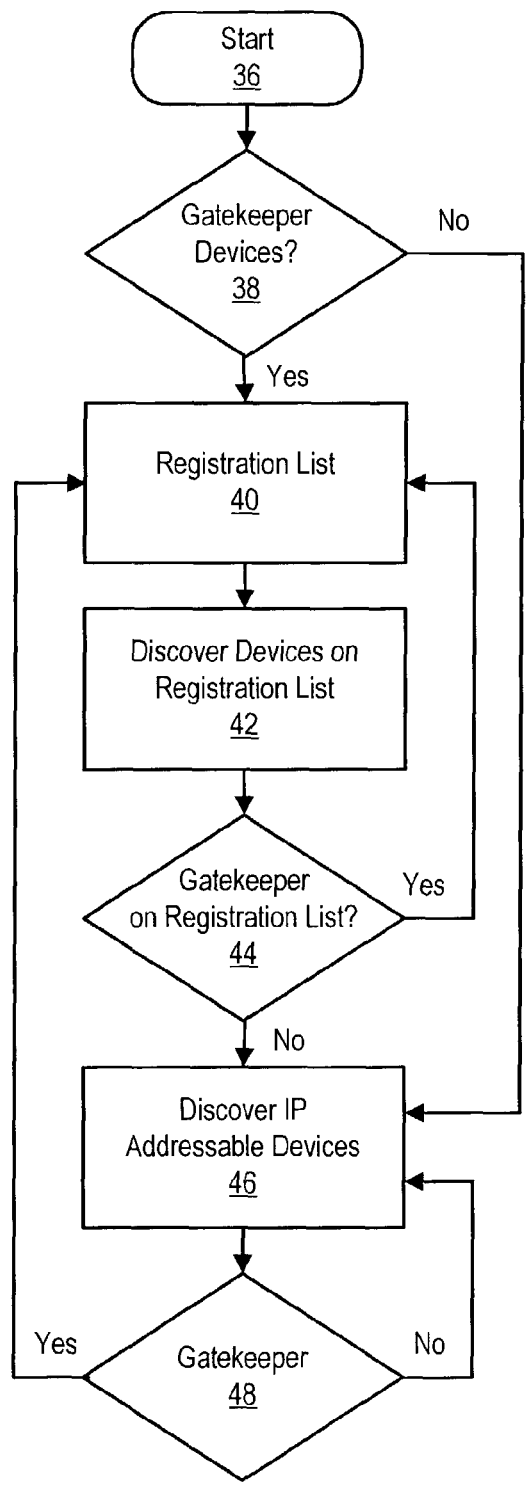
FIG. 2 depicts a flow diagram of a process for discovery of a video network configuration.

Referring now to FIG. 2, a flow diagram depicts a process for discovery of a video network configuration. The process starts at step 36 and proceeds to step 38 with a query by discovery engine 28 to discovery instructions 30 for any known gatekeeper devices. If no gatekeeper devices are known, the process proceeds to step 46 with the discovery of IP addressable devices. If a gatekeeper device is known, the process proceeds to step 40 at which discovery engine 28 accesses the registration lists 26 of the known gatekeeper devices 22. At step 42 discovery engine 28 performs discovery on the devices registered with the known gatekeeper devices 22. At step 44, a determination is made of whether any of the devices registered with the known gatekeeper devices are also gatekeeper devices. If yes, the process proceeds to step 40 so that discovery engine 28 accesses the additional registration list 26 and performs discovery on the devices of that list. If no, the process proceeds to step 46 for the discovery of IP addressable devices until the discovery process is complete. After the discovery of an IP addressable device at step 46, a determination is made at step 48 of whether the discovered device is a gatekeeper 22. If yes, the process returns to step 40 to discover the devices on the registration list 26. If no, the process returns to step 46 to continue with general discovery. In alternative embodiments, discovery of networks other than video networks is enhanced by using information on a network device to learn of other network devices and reduce the number of discovery tests accordingly.

FIG. 3 depicts an example of a video network configuration 34 provided by discovery engine 28. Discovery of video devices provides information for using the devices on the video network, such as device ID, IP address, protocol, type, manufacturer and model. By using gatekeeper 22 registration list 26, video network devices are more easily identified. Additional video devices that are not registered with a gatekeeper, such as H.320 endpoints, may still be found during discovery of IP addressable devices and then added to video network configuration 34.

Although the present invention has been described in detail, it should be understood that various changes, substitutions and alterations can be made hereto without departing from the spirit and scope of the invention as defined by the appended claims.

What is claimed is:

1. A system that discovers devices in a network, comprising:
   a network management station that includes:
   a discovery engine configured to execute the following functions in the order recited:
   initiate a device discovery process in a network;
   determine that a device in the network is a gatekeeper, which is configured to maintain data transmission compatibility for video devices, accept endpoint registrations, translate names to internet protocol addresses, and govern calls to manage bandwidth;
   in response to a determination that the device in the network is a gatekeeper, automatically retrieve a list of network devices registered with the gatekeeper from the gatekeeper;
   determine types of devices included on the list retrieved from the gatekeeper;
   dynamically select a subset of one or more discovery tests from a plurality of available discovery tests to discover a configuration of the types of devices on the list, said subset of one or more discovery tests only including the discovery test or tests that are associated with the types of devices on the list retrieved from the gatekeeper, and eliminate an unnecessary discovery test or tests that correspond with devices not on the list, and
   perform the subset of discovery tests associated with the types of devices on the list retrieved from the gatekeeper to identify the configuration of devices on the list.

2. The system of claim 1, wherein the list of network devices includes a second gatekeeper, and the discovery engine is further configured to
   automatically retrieve information pertaining to network devices associated with the second gatekeeper from the second gatekeeper, and
   optimize a process of discovering characteristics of the devices associated with the second gatekeeper by selecting a discovery test to be applied to at least one such device based on information retrieved from the second gatekeeper.

3. The system of claim 1, wherein some devices on the network comprise video devices.

4. The system of claim 1, wherein some devices on the network comprise network devices configured to perform video conferencing functions.

5. The system of claim 1, wherein a non-selected discovery test is a router filter test.

6. The system of claim 1, wherein a non-selected discovery test is a switch filter test.

7. A method for discovering devices in a network executed by a network management station, the method comprising steps performed in the following order:
   initiating, at the network management station, a device discovery process in a network;
   determining, at the network management station, that a device in the network is a gatekeeper, which is configured to maintain data transmission compatibility for video devices, accept endpoint registrations, translate names to internet protocol addresses, and govern calls to manage bandwidth;
   in response to determining that the device in the network is a gatekeeper, automatically retrieving, at the network management station, a list of network devices registered with the gatekeeper from the gatekeeper;
   determining, at the network management station, types of devices included on the list retrieved from the gatekeeper;
   dynamically selecting, at the network management station, a subset of one or more discovery tests from a plurality of available discovery tests to discover a configuration of the types of devices on the list, said subset of one or more discovery tests only including the discovery test or tests that are associated with the types of devices on the list retrieved from the gatekeeper, and eliminating an unnecessary discovery test or tests that correspond with, devices not on the list; and
   performing, at the network management station, the subset of discovery tests associated with the types of devices on the list retrieved from the gatekeeper to identify the configuration of devices on the list.

8. The method of claim 7, wherein the list of network devices includes a second gatekeeper, and the method further comprises:

automatically retrieving information pertaining to network devices associated with the second gatekeeper from the second gatekeeper; and optimizing a process of discovering characteristics of the devices associated with the second gatekeeper by selecting a discovery test to be applied to at least one such device based on information retrieved from the second gatekeeper.

9. The method of claim 7, wherein at least one device on the network is a video endpoint.

10. The method of claim 7, wherein at least one device on the network is a video MCU device.

11. The method of claim 7, wherein at least one device on the network is a video gateway device.

12. The method of claim 7, wherein at least one device on the network is a network device that performs the function of a video device with Internet Protocol.

13. The method of claim 12, wherein the network device comprises a server having a module that performs video MCU device functionality.

* * * * *